United States Patent
Sander et al.

(10) Patent No.: US 6,976,122 B1
(45) Date of Patent: Dec. 13, 2005

(54) DYNAMIC IDLE COUNTER THRESHOLD VALUE FOR USE IN MEMORY PAGING POLICY

(75) Inventors: Benjamin Thomas Sander, Austin, TX (US); Philip Enrique Madrid, Round Rock, TX (US); Gregory William Smaus, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 482 days.

(21) Appl. No.: 10/176,771

(22) Filed: Jun. 21, 2002

(51) Int. Cl.$^7$ .......................................... G06F 12/00
(52) U.S. Cl. ........................ 711/105; 711/154; 711/167
(58) Field of Search .................................. 711/154, 105

(56) References Cited

U.S. PATENT DOCUMENTS

| | | | |
|---|---|---|---|
| 5,848,025 A * | 12/1998 | Marietta et al. ......... | 365/238.5 |
| 6,199,145 B1 * | 3/2001 | Ajanovic et al. ........... | 711/149 |
| 6,363,460 B1 | 3/2002 | Jeddeloh | |
| 6,389,514 B1 * | 5/2002 | Rokicki ...................... | 711/136 |
| 6,604,186 B1 * | 8/2003 | Fanning ...................... | 711/209 |
| 6,799,241 B2 * | 9/2004 | Kahn et al. ................. | 711/105 |

* cited by examiner

Primary Examiner—Kevin Verbrugge
(74) Attorney, Agent, or Firm—Meyertons Hood Kivlin Kowert & Goetzel, P.C.; B. Noël Kivlin

(57) ABSTRACT

A memory controller includes a threshold register that stores a value indicating a length of time and a control unit. In response to a first memory access request, the control unit generates signals that cause a memory device to open a page of memory. The control unit generates signals that cause the memory device to close the page if the page has been open for the length of time indicated by the value in the threshold register. The control unit modifies the value in the threshold register in response to receiving a second memory access request. For example, if the second memory access request causes a page miss for a most recently open page, the control unit may increase the value in the threshold register. The control unit may decrease the value in the threshold register in response to a page conflict caused by the second memory access request.

40 Claims, 5 Drawing Sheets

DYNAMIC IDLE COUNTER THRESHOLD VALUE FOR USE IN MEMORY PAGING POLICY

BACKGROUND OF THE INVENTION

1. Field of the Invention

This invention relates to computer systems and, more particularly, to paging policies used in memory devices.

2. Description of the Related Art

DRAM (Dynamic Random Access Memory) devices are often divided up into chip selects (CS), and each chip select is often subdivided into banks. A bank of memory typically includes an array of rows and columns of memory elements. The memory elements included in a particular CS, bank, and row are called a page. In order to access data within a page of memory, the page is activated, or opened, which loads the contents of the page from the memory array into a buffer (e.g., a sense amplifier) on the memory chip being accessed, allowing a read or write access to data within that page to take place.

Once a page is open, a subsequent request to access data within that page can be performed without needing to reopen the page. This scenario is called a page hit. A page hit has low latency because there is no need to open the page before the requested access can take place. A subsequent request to a different, inactive page within a bank that already has an active page is called a page conflict. Page conflicts have a higher latency because they require that the currently open page be closed (e.g., by precharging the bank) and the requested page then be opened before the requested access can take place. Additionally, if a prior request that activated the currently open page has not yet completed, the conflicting request will be stalled because the bank cannot be closed until the prior request completes.

Various paging policies have been developed to control when open pages are closed. These paging policies have been designed in order to either benefit from page hits or to decrease the likelihood of page conflicts. One paging policy is a closed paging policy. In a closed paging policy, pages are closed as soon as each access completes. While a closed paging policy reduces the risk of page conflicts occurring, it also reduces the likelihood of page hits.

Another paging policy is called an open paging policy. In an open paging policy, a page is left open after the current request completes. The page is closed when a page conflict is detected. An open paging policy is effective and efficient if the majority of the requests to the memory are expected to be page hits, since these requests can then be satisfied by simply performing the read or write operation to the already-opened page. This policy may be substantially less effective and efficient, however, if the majority of the memory requests turn out to be page conflicts. As mentioned above, page conflicts have longer latency, especially if the prior request has not completed yet. As a result, an open paging policy creates a risk of a significant performance loss.

A less-risky version of an open paging policy involves leaving pages open for a certain number of cycles before closing the page. This modified open paging policy is typically implemented by initializing a counter to a preselected threshold value when a page is opened and decrementing the counter each subsequent cycle that the page remains open. If the page is not accessed before the counter expires, the page is closed. This paging policy may improve performance, but it may still offer less than optimal performance in response to different memory access patterns. For example, if a series of page hits would have occurred if the threshold value had been higher, this paging policy is less efficient than an open paging policy. Similarly, if a series of page conflicts would not have occurred if the threshold value had been slightly lower, this paging policy is less efficient than a closed paging policy. Furthermore, if both types of access patterns are expected to occur, it may be difficult to select an ideal threshold value. Accordingly, it is desirable to be able to implement an improved paging policy.

SUMMARY

Various embodiments of a memory controller may be implemented using a dynamic threshold value to control how long pages remain open. In one embodiment, a memory controller may include a threshold register configured to store a value indicating a length of time and a control unit coupled to the threshold register. In response to receiving a first memory access request, the control unit may be configured to generate signals configured to cause a memory device to open a page of memory. The control unit is configured to generate signals configured to cause the memory device to close the page if the page has been open for the length of time indicated by the value stored in the threshold register. The control unit may be configured to modify the value stored in the threshold register in response to receiving a second memory access request. For example, if the second memory access request causes the control unit to detect a page miss for a most recently open page, the control unit may increase the value stored in the threshold register. Similarly, the control unit may decrease the value stored in the threshold register in response to detecting a page conflict caused by the second memory access request.

In some embodiments, the amount by which the control unit modifies the threshold value may differ depending on whether the modification is an increase or a decrease. The amount may also differ depending on how many successive page conflicts or page misses for the most recently open page have been detected.

In one embodiment, a computer system may include a memory device and a memory controller coupled to the memory device. In response to a first memory access request, the memory controller may be configured to generate signals that cause the memory device to open a first page within a first bank. If the first page has been open for a length of time indicated by a value stored in a threshold register included in the memory controller, the memory controller may be configured to generate signals that cause the memory device to close the first page. The memory controller is configured to modify the value stored in the threshold register in response to a second memory access request.

One embodiment of a method may involve opening a first page in a memory device in response to a first memory request, closing the first page if the first page has been open for a length of time indicated by a threshold value, and modifying the threshold value in response to a second memory request. For example, modifying the threshold value may involve increasing the threshold value in response to a page miss for a most recently open page or decreasing the value stored in the threshold register in response to a page conflict.

In another embodiment, a method may involve opening a first page in a memory device, decreasing a threshold value if a page conflict is detected, closing the first page if the first page has been open for a length of time indicated by the threshold value, and increasing the threshold value if a page miss for the first page is detected after the first page is closed.

BRIEF DESCRIPTION OF THE DRAWINGS

A better understanding of the present invention can be obtained when the following detailed description is considered in conjunction with the following drawings, in which.

Figure 1:
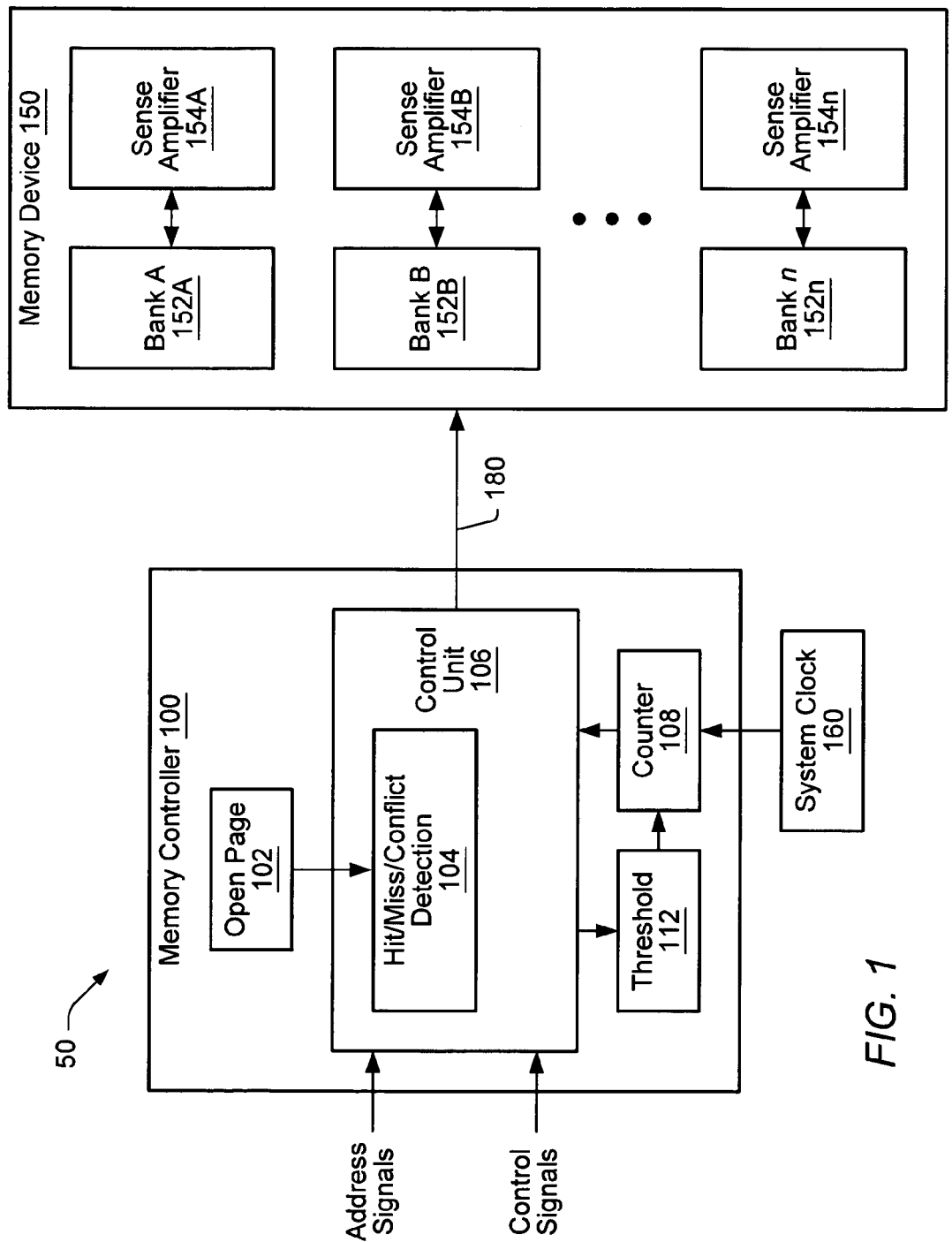
FIGS. 1–2 illustrate various embodiments of memory system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows one embodiment of a memory system 50 that includes a memory controller 100 and a memory device 150. Memory device 150 may be a DRAM device such as DDR SDRAM (Double Data Rate Synchronous DRAM), VDRAM (Video DRAM), RDRAM (Rambus DRAM), etc. Note that components referred to by the same reference numeral followed by an alphabetic identifier (e.g., memory banks 152A–152N) may be collectively referred to by that reference numeral alone (e.g., memory banks 152).

Memory device 150 includes N banks of memory 152A–152N and N sense amplifiers 154A–154N. Each bank 152 is coupled to a respective sense amplifier 154. Each of the N banks includes multiple memory elements each configured to store one or more bits of data. The memory elements within each bank may be organized into pages. For example, in a memory device 150 that is addressable by rows and columns, each page may include a row of memory elements included in a particular bank. The contents of a page of memory elements may be read or written by outputting that page's contents to the appropriate sense amplifier 154. Each sense amplifier 154 may include a storage element for each bit in a page. Note that memory device 150 may include multiple memory modules (e.g., SIMMs or DIMMs). Each memory module may include one of more of the banks 152A–152N. A page is defined as being "open" if it has been activated into a sense amplifier or another suitable buffer such as a register from which that page can be accessed. A pre-charge operation to a bank closes any page that is currently open within that bank.

Memory controller 100 includes a control unit 106 that receives address and control signals from devices requesting access to memory device 150. When memory controller 100 receives a memory request (e.g., from a CPU or graphics controller across a system bus), control unit 106 may decode a received address into an appropriate address form for memory device 150. For example, in one embodiment, control unit 106 may determine the bank, row, and column corresponding to the received address and generate signals 180 that identify that bank, row, and/or column to memory device 150. Signals 180 may also identify the type of access being requested. Control unit 106 may determine what type of signals 180 to generate based on the current state of the memory device 150 and the type of access currently being requested (as indicated by the received control signals). Signals 180 may be generated by asserting and/or deasserting various control and/or address signals.

In some embodiments, the address may be supplied to the memory device 150 in two phases: a row address and a column address. The control unit 106 may generate signal(s) 180 representing a portion of the address to the appropriate memory bank(s) and strobing one or more row address strobe (RAS) signals. Strobing RAS opens a memory page within one or more of the memory banks 152A–152N. A memory location within a memory page may be selected for access by control unit 106 generating a column address to memory device 150 and strobing one of the column address strobe (CAS) signals to the appropriate memory bank. If a read access is being performed, the selected data for the memory location addressed within the open memory page may then be output (e.g., onto a system bus). Write accesses may be performed in a similar manner except data may be supplied to the memory device 150 and the control unit 106 may generate a write enable signal.

Control unit 106 is coupled to a counter 108, a threshold register 112, and one or more open page registers 102. Open page registers 102 each store a value identifying a recently opened page. Each open page register 102 may have an associated indication (e.g., a status bit) that indicates whether the page identified by that register is currently open. A closed page may be identified in an open page register 102 if that page is the most recently opened page in a particular bank or group of banks (e.g., no other page in the same bank has been opened since that page was closed).

Threshold register 112 may store a value indicating how long a page should remain open. Control unit 106 may load the value stored in the threshold register 112 into counter 108 at approximately the same time as a page is opened. The counter 108 may be decremented (e.g., in response to a system clock signal generated by system clock 160) until it reaches a minimum value (e.g., zero). When the counter 108 reaches the minimum value, the control unit 106 may generate signals 180 that cause memory device 150 to close the currently open page. In some embodiments, the counter may be reset to the threshold value if a page hit is detected. If memory controller 100 allows multiple pages in memory device 150 to be open at the same time, multiple counters 108 may be included. For example, if a page may be open in each bank 152 at the same time, each bank 152 may have an associated counter 108.

Note that in alternative embodiments, the value stored in threshold register 112 may be used to control how long pages remain open in other ways. For example, in one embodiment, control unit 106 may initialize counter 108 to zero each time a page is opened. The counter 108 may be incremented each cycle. The control unit 106 may compare the current counter value to the value stored in threshold register 112. If the two values are equal, the control unit 106 may close the currently open page.

Control unit 106 includes a hit/miss/conflict detection unit 104. The hit/miss/conflict detection unit 104 may compare pages identified by an incoming access requests to the page identifiers in the open page register(s) 102 to determine whether a new access request results in a page hit, a page miss, or a page conflict. If a page miss occurs, hit/miss/conflict detection unit 104 may detect whether the requested page is the most recently open page. The signals 180 generated by control unit 106 to implement a requested memory access may vary depending on whether there is a page hit, a page miss, or a page conflict. Note that some embodiments may allow several pages within memory device 150 to be open at the same time, and thus there may be several open page registers 102 in such embodiments.

A page hit occurs when the new access requests access to a page that is already open in one of the sense amplifiers 154. If a page hit is detected for a new access request, control unit 106 may send signals 180 to the memory device 150 indicating that the requested type of access should be performed on data already loaded in the sense amplifier (e.g., the control unit 106 may generate a column address and strobe a CAS signal), potentially reducing access time. Page hit accesses may be performed in rapid succession by access cycles called bursts.

A page miss occurs when the new access request accesses a page that is not already open in one of the sense amplifiers 154. The requested page is included in a bank 152 that does not currently have an open page. In this case, the control unit 106 may generate signals 180 (e.g., strobing RAS and generating a row address) indicating that the requested page should be opened in order to cause memory device 150 to load the requested page into a sense amplifier 154. The control unit 106 may generate signals identifying which portion of the page is being accessed as well as a control signal indicating what type of access is taking place (e.g., the control unit 106 may send a column address and strobe the appropriate CAS signal) in order to perform the requested access once the page is open.

If the requested page is included in a bank that already has an open page, and if the open page is not the requested page, a page conflict is detected. Before the requested page can be opened, the open page should be closed (unless the data in the open page is being copied to the requested page). Thus, in order to perform the requested access, the memory controller 100 may generate signals that cause memory device 150 to close the currently open page. For example, the signals 180 may cause the memory device 150 to precharge a bank (e.g., by deactivating a signal line used to select the currently open page and equalizing the sense amplifiers coupled to that bank). Then, the requested page may be opened and accessed in the same way as described above for a page miss.

Control unit 106 is configured to dynamically update the value stored in threshold register 112 in response to current memory access patterns. If a page miss occurs and the requested page is also the most recently closed page, the value stored in the threshold register 112 may be increased. For example, each time a page miss is detected, the control unit 106 may compare the address of the new request to the address of the most recently open page, as indicated in open page registers 102. If the addresses match, the control unit 106 may increase the value stored in the threshold register 112. If a page conflict occurs, the value stored in the threshold register 112 may be decreased. Page hits may not affect the value stored in the threshold register 112.

If receipt of a new access request causes the value in the threshold register 112 to be modified, the modified value in the threshold register 112 may be used as the initial counter value for the page that is opened in response to that new access request. In other embodiments, the modified threshold register value may not be used as the initial counter value until the next time a page is opened. The value in the threshold register 112 may be loaded into the counter 108 each time the counter is reset or initialized.

By adjusting the value stored in the threshold register 112, the likelihood of page conflicts may be reduced and the likelihood of page hits may be increased in some embodiments. For example, if the value is decreased in response to a page conflict, subsequently opened pages will be closed more quickly and the likelihood of subsequent page conflicts may be decreased. If the value is increased, subsequently opened pages will be closed less quickly and the likelihood of page hits may be increased. Streams of page conflicts or page misses may bias the threshold value downwards or upwards. For example, if the current memory access pattern involves many localized accesses to addresses within the same page, the value in the threshold register 112 may be increased (or at least not decreased) in order to increase the likelihood of page hits occurring. If instead the current memory access pattern involves more random accesses to addresses that are not within the same page, the value in the threshold register 112 may be decreased (or at least not increased) in order to decrease the likelihood of subsequent page conflicts occurring. Thus, a dynamic threshold value may allow a memory controller 100 to adjust its paging policy based on current memory access patterns.

In some embodiments, there may be minimum and/or maximum values that may be stored in the threshold register 112. For example, the minimum value may be a value (e.g., zero) indicating that pages should be closed as soon as the current access completes. A maximum value may also be provided (e.g., the maximum value may be the maximum value that can be stored in the threshold register 112, as determined by size of the threshold register). The control unit 106 may be configured to not increase and/or decrease the value in the threshold register 112 beyond the maximum and/or minimum allowable values (e.g., the control unit 106 may inhibit modification of the threshold register's value if doing so would increase or decrease the threshold value beyond maximum or minimum values). The threshold register 112 may be implemented by a counter to facilitate threshold value modification in some embodiments.

The amount by which the value in the threshold register 112 is increased or decreased may vary depending on the number of consecutive misses or conflicts that have occurred. For example, the amount by which the value is decreased may increase each time there is another consecutive conflict. In one embodiment, the amount by which the threshold value is modified may vary exponentially depending on the number of consecutive misses or conflicts that have been detected. In other embodiments, the amount by which the value is increased or decreased may be a constant value.

The amount by which the value in the threshold register 112 is increased may differ from the amount by which the value is decreased. For example, in response to a page conflict, the value in the threshold register may be decreased by twice as much as the value in the threshold register would be increased in response to a page miss to the most recently opened page.

Before any modifications are made to the value in the threshold register 112, the value may be a default value. The threshold register 112 may be initialized to the default value each time the memory controller 100 is powered on. The default value may equal a minimum or maximum threshold register value in some embodiments.

In some embodiments, memory controller 100 may include a number of threshold registers 112 equal to a maximum number of open pages allowed by the controller 100 at any given time. For example, if memory controller 100 includes tracking logic for four open pages (e.g., four counters 108 and four open page registers 102), memory controller 100 may include four threshold registers 112. Each threshold register may be associated with a respective one of the four sets of tracking logic. The value stored in a particular threshold register 112 may be loaded into its respective counter 108 whenever that counter is used to track an open page. In some embodiments, if the currently open page is closed and a page within another bank is opened, a default value may be loaded into the threshold register 112 used to control when the newly opened page should be closed. In other embodiments, however, the current value in the threshold register 112 may be used to control when the newly opened page from the other bank should be closed.

If the same threshold register 112 stores a value used to control when open pages within two or more different banks are closed, access patterns to different banks within memory device 150 may interfere with the value stored in that threshold register 112. For example, if one bank 152A is receiving a stream of requests that are resulting in page conflicts while another bank 152B is receiving a stream of requests that result in page hits, the first stream of requests may bias the value in the threshold register 112 downwards while the second stream biases the value upwards. The two streams may reduce each other's effects on the value in the threshold register 112. Accordingly, the value in the threshold register may be a value that provides less than optimal performance for both request streams.

Figure 2:
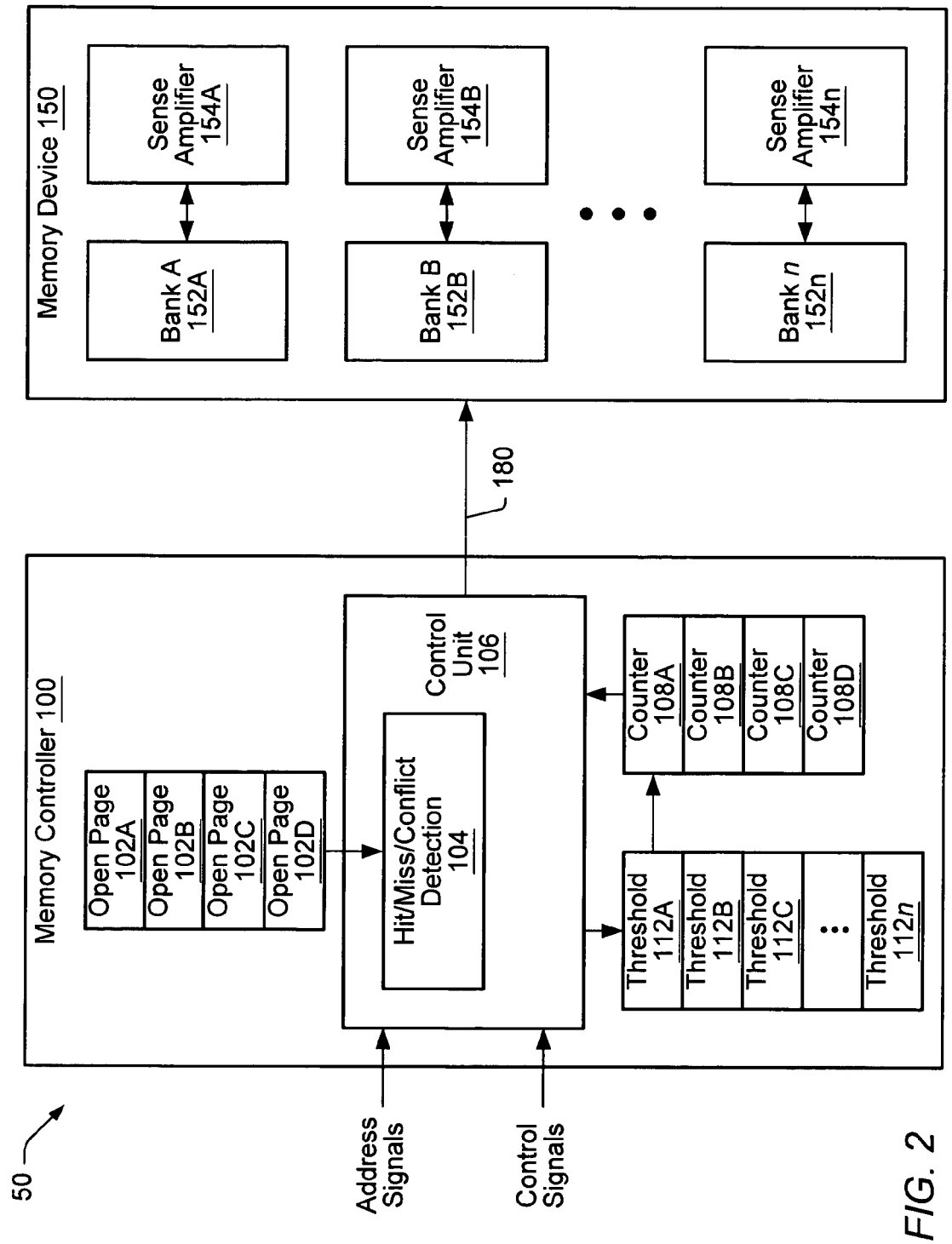

Alternative embodiments may include a threshold register 112 for each bank 152 within memory device 150 (or, if memory device 150 includes fewer than the maximum number of banks supported by memory controller 100, memory controller 100 may include a threshold register 112 for each of the maximum number of supported banks). In some embodiments, memory controller 100 may include a threshold register 112 for each supported bank even if the memory controller 150 does not allow all of the banks to have an open page at the same time. FIG. 2 shows one such embodiment of a memory system 50. This embodiment includes page tracking logic to track four open pages at a time, so in this example there are four counters 108A–108D and four open page registers 102A–102D. However, there are N threshold registers 112A–112N for each of the N banks 154 that the memory controller is capable of controlling.

To illustrate, assume a page within bank 154B is opened in response to an access request. When the page is opened, the page identifier of that page may be loaded into one of the open page registers, e.g., open page register 102C. The value stored in the threshold register 112B associated with bank 154B may be loaded into one of the counters, e.g., counter 108C, and that counter 108C may be used to control when the page is closed. If a page conflict is detected (i.e., access to another page within bank 154B is requested while the other page is still open), the value in the associated threshold register 112B may be decreased. If the page is closed and the next request targeting that bank 154B requests the most recently opened page, as indicated by the value stored in open page register 102C, the value in the associated threshold register 112B may be increased. If a page in another bank 154A is accessed and counter 108C and open page register 102C are used to track that page, the value stored in the threshold register 112B may remain unchanged. The value stored in the threshold register 112A associated with bank 154A may be loaded into the counter 108C and used to control when the newly opened page is closed.

Accordingly, even when a bank 154 does not have an open page, that bank's threshold value may be saved in a respective threshold register 112, allowing its access pattern history to be used to determine the paging policy for that bank the next time a page within that bank is opened. Furthermore, since each bank has its own threshold register, one bank's current memory access pattern may not adversely affect the value stored in another bank's threshold register.

Figure 3:
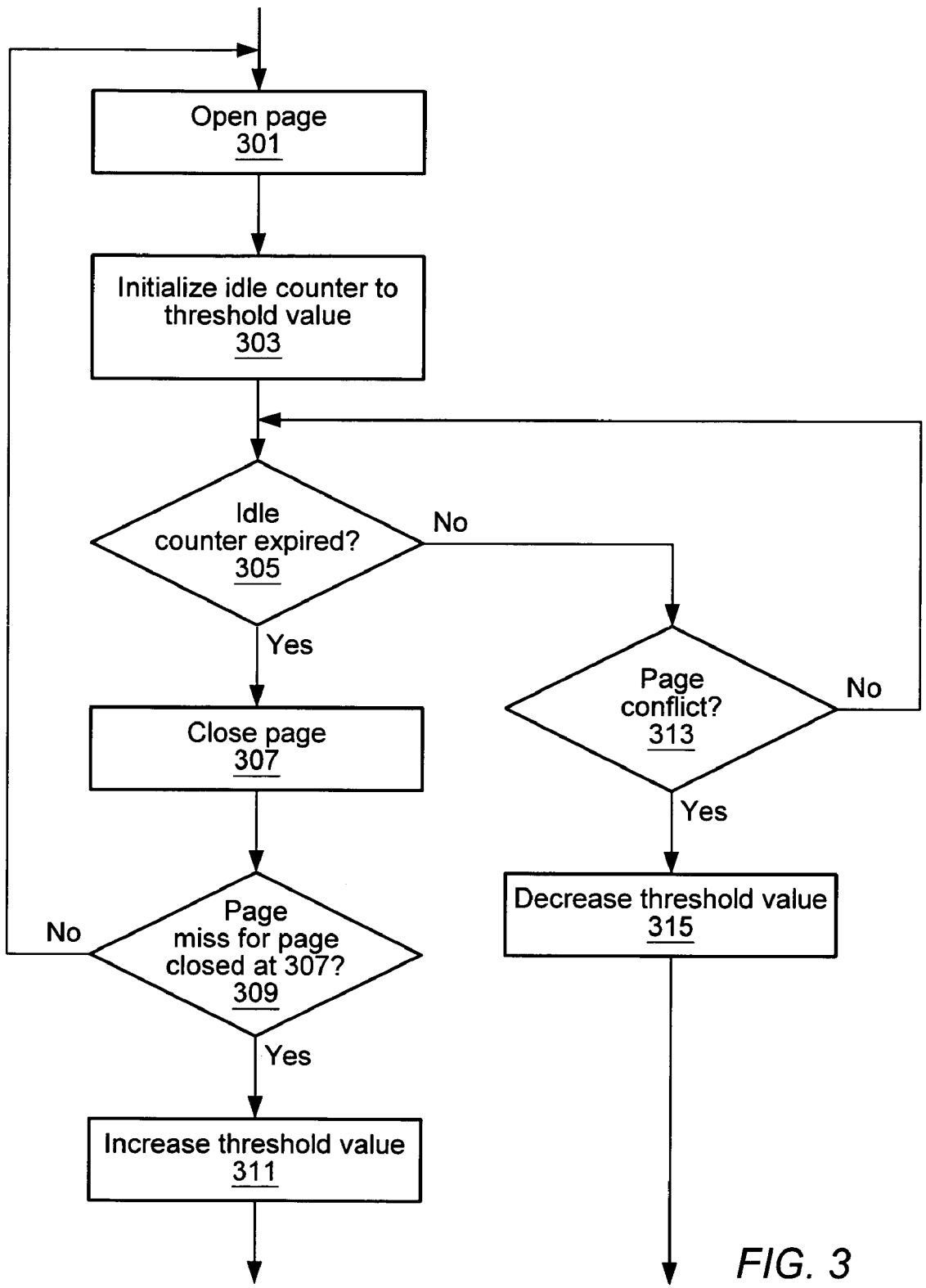
FIG. 3 is a flowchart of one embodiment of a method of operating a memory system.

FIG. 3 illustrates one embodiment of a method of using a threshold value to control when open pages are closed and updating that threshold value in response to current memory access patterns. At 301, a page is opened (e.g., by loading the contents of a group of memory elements into a sense amplifier or other page buffer). A threshold value controls how long the page opened at 301 will remain open. For example, an idle counter may be initialized to the threshold value, as shown at 303. Note that in some embodiments the threshold value may be used to control how long a page remains open after a page hit. For example, the idle counter may be initialized to the threshold value in response to a page hit.

The idle counter initialized at 303 may be decremented each system clock cycle subsequent to completion of the memory access that caused the page to be opened (or that caused a page hit) at 301. When the idle counter expires, the page may be closed, as shown at 305–307. In alternative embodiments, the counter may be initialized to zero and incremented each cycle. The counter value may be compared to the threshold value to determine whether the page should be closed. Other embodiments may use the threshold value to control a paging policy in other ways.

If, before the page is closed, an access request is received for an address that causes a page conflict, the current page may be closed (e.g., by performing a precharge) and the requested page may be opened and the requested access may be performed. In response to detection of the page conflict, the threshold value may be decreased. The idle counter may be initialized to this lower value and used to control when the newly opened page is closed.

After the page opened at 301 is closed at 307 in response to expiration of the idle counter, a page miss may be detected for a subsequently received access request. If the newly requested page is the most recently opened page in its bank (e.g., the page closed at 307), the threshold value may be increased, as shown at 309–311. This increased threshold value may be used to control when the reopened page is closed. If neither a page conflict nor a page miss for the most recently opened page is detected, the threshold value may remain unchanged.

Figure 4:
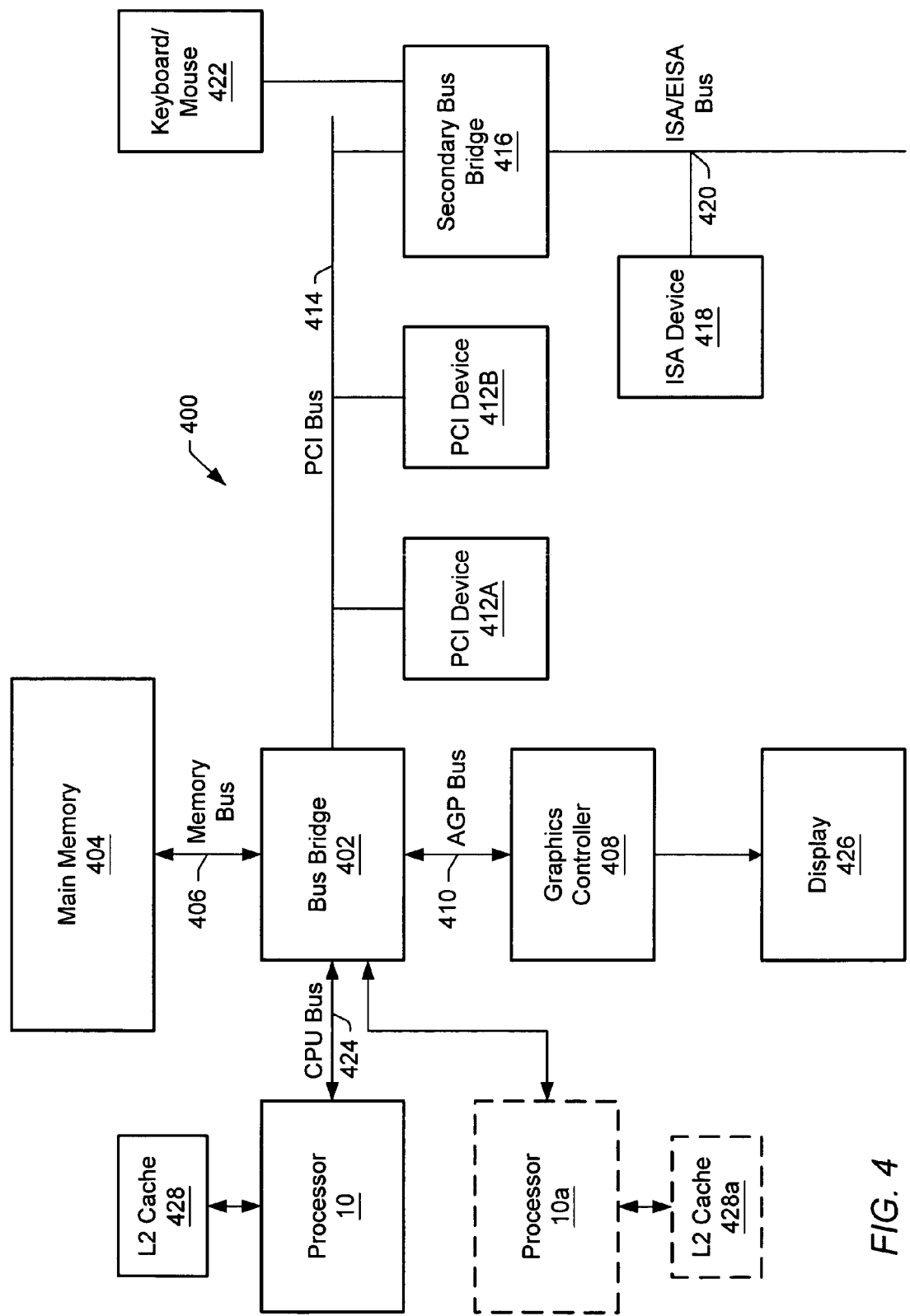
FIGS. 4 and 5 are block diagrams of embodiments of a computer system that may include an embodiment of a memory system like those shown in FIGS. 1–2.

FIG. 4 shows a block diagram of one embodiment of a computer system 400 that includes a processor 10 coupled to a variety of system components through a bus bridge 402. Computer system 400 may include an embodiment of a memory system like the ones illustrated in FIGS. 1–2. Note that the illustrated embodiment is merely exemplary, and other embodiments of a computer system are possible and contemplated. In the depicted system, a main memory 404 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, processor 10 is coupled to bus bridge 402 through a CPU bus 424 and to an optional L2 cache 428. In some embodiments, the processor 10 may include an integrated L1 cache (not shown).

Bus bridge 402 provides an interface between processor 10, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus. Bus bridge 402 may include a memory controller 100 as described above in some embodiments. In other embodiments, certain functionality of bus bridge 402, including that provided by memory controller 100, may be integrated into processors 10 and 10a.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 10 and bus bridge 402 in other embodiments. Alternatively, the external cache may be coupled to bus bridge 402 and cache control logic for the external cache may be integrated into bus bridge 402. L2 cache 428 is shown in a backside configuration to processor 10. It is noted that L2 cache 428 may be separate from processor 10, integrated into a cartridge (e.g., slot 1 or slot A) with processor 10, or even integrated onto a semiconductor substrate with processor 10.

Main memory 404 is a memory in which application programs are stored and from which processor 10 primarily executes. A suitable main memory 404 includes DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

Figure 5:
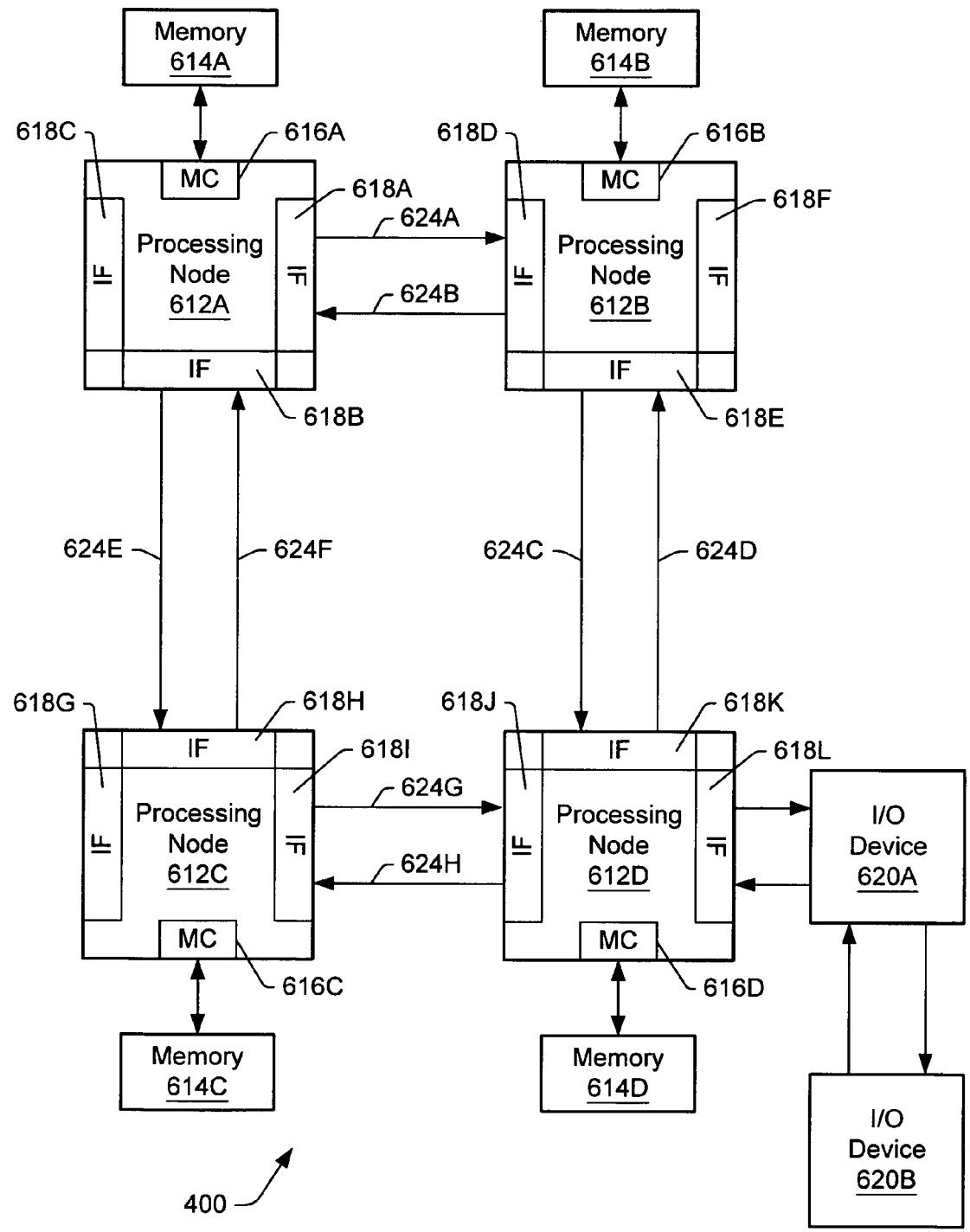

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 10a shown as an optional component of computer system 400). Processor 10a may be similar to processor 10. More particularly, processor 10a may be an identical copy of processor 10. Processor 10a may be connected to bus bridge 402 via an independent bus (as shown in FIG. 5) or may share CPU bus 224 with processor 10. Furthermore, processor 10a may be coupled to an optional L2 cache 428a similar to L2 cache 428.

Turning now to FIG. 5, another embodiment of a computer system 400 that may include a memory controller 100 as described above is shown. Other embodiments are possible and contemplated. In the embodiment of FIG. 5, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 5. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 5. Any suitable routing algorithm may be used. Other embodiments of computer system 400 may include more or fewer processing nodes then the embodiment shown in FIG. 5.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more processors. Broadly speaking, a processing node includes at least one processor and may optionally include a memory controller for communicating with a memory and other logic as desired. More particularly, each processing node 612A–612D may include one or more copies of processor 10. External interface unit 18 may includes the interface logic 618 within the node, as well as the memory controller 616. Each memory controller 616 may include an embodiment of memory controller 100, as described above.

Memories 614A–614D may include any suitable memory devices. For example, a memory 614A–614D may include one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, bard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A memory controller comprising:
a threshold register configured to store a value indicating a length of time;
a control unit coupled to the threshold register, wherein in response to receiving a first memory access request, the control unit is configured to generate signals configured to cause a memory device to open a page of memory, and wherein the control unit is configured to generate signals configured to cause the memory device to close the page if the page has been open for the length of time indicated by the value stored in the threshold register;
wherein the control unit is configured to increase the value stored in the threshold register if a page miss for a most recently open page is detected in response to receiving a second memory access request and to decrease the value stored in the threshold register if a page conflict is detected in response to receiving the second memory access request;
wherein the control unit is configured to inhibit modification of the value stored in the threshold register in response to a page hit.

2. The memory controller of claim 1, wherein the control unit is configured to increase the value stored in the threshold register by a first amount and to decrease the value stored in the threshold register by a second amount.

3. The memory controller of claim 1, wherein the control unit is configured to decrease the value stored in the threshold register by a fixed amount each time a page conflict is detected.

4. A memory controller comprising:
a threshold register configured to store a value indicating a length of time;
a control unit coupled to the threshold register, wherein in response to receiving a first memory access request, the control unit is configured to generate signals configured to cause a memory device to open a page of memory, and wherein the control unit is configured to generate signals configured to cause the memory device to close the page if the page has been open for the length of time indicated by the value stored in the threshold register;
wherein the control unit is configured to modify the value stored in the threshold register in response to receiving a second memory access request and wherein the control unit is configured to decrease the value stored in the threshold register by a variable amount in response to detecting a page conflict, wherein the variable amount is dependent on how many consecutive page conflicts have been detected.

5. The memory controller of claim 4, wherein the variable amount is varied exponentially in response to successive page conflicts.

6. The memory controller of claim 1, further comprising a counter, wherein the control unit is configured to initialize the counter to the value stored in the threshold register in response to opening a page, wherein the counter is decremented each cycle that the page remains open, and wherein the control unit is configured to generate the signals to close the page in response to the counter having a minimum value.

7. The memory controller of claim 1, further comprising a counter, wherein the control unit is configured to initialize the counter to the value stored in the threshold register in response to a page hit, wherein the counter is decremented each cycle that the page remains open, and wherein the control unit is configured to generate the signals to close the page in response to the counter having a minimum value.

8. The memory controller of claim 1, wherein the threshold register stores a default value if the control unit has not modified the value stored in the threshold register.

9. The memory controller of claim 1, further comprising N sets of page tracking logic, wherein the threshold register is a first threshold register of N threshold registers included in the memory controller, wherein N is an integer greater than or equal to one, and wherein the memory controller is configured to control memory devices including up to M banks, wherein M>N.

10. The memory controller of claim 9, wherein in response to an indication that the first threshold register will be used to store a first value indicating how long a page in a first bank should remain open, the control unit is configured to reset the value in the first threshold register to a default value if the first threshold register is currently being used to store a second value indicating how long a page in a second bank should remain open.

11. The memory controller of claim 1, wherein the threshold register is one of M threshold registers included in the memory controller, wherein the memory controller is configured to control memory devices including up to M banks, wherein M is an integer greater than one.

12. The memory controller of claim 11, wherein each of the M threshold registers is configured to store a threshold value associated with a respective one of the up to M banks.

13. The memory controller of claim 12, wherein the control unit is configured to modify a value stored in a first threshold register of the M threshold registers in response to an access request targeting a first bank of the M banks, wherein the control unit is configured to inhibit modification of the value stored in the first threshold register in response to access requests targeting banks other than the first bank.

14. The memory controller of claim 1, wherein the control unit is configured to inhibit modification of the value stored in the threshold register if modifying the value would increase the value beyond a maximum value or decrease the value beyond a minimum value.

15. The memory controller of claim 1, wherein the value identifies a number of clock cycles.

16. The memory controller of claim 1, wherein the threshold register is associated with a first bank included in the memory device, and wherein the control unit is configured to increase the value stored in the threshold register in response to a page miss if a missed page matches a most recently opened page in the first bank.

17. A computer system comprising:
a memory device comprising a first bank; and
a memory controller coupled to the memory device, wherein in response to a first memory access request, the memory controller is configured to generate signals that cause the memory device to open a first page within the first bank;
wherein if the first page has been open for a length of time indicated by a value stored in a threshold register included in the memory controller, the memory controller is configured to generate signals that cause the memory device to close the first page;
wherein the memory controller is configured to increase the value stored in the threshold register if a page miss for a most recently open page is detected in response to receiving a second memory access request and to decrease the value stored in the threshold register if a page conflict is detected in response to receiving the second memory access request;
wherein the memory controller is configured to inhibit modification of the value stored in the threshold register in response to a page hit.

18. The computer system of claim 17, wherein the memory controller is integrated with a processor, wherein the processor is configured to generate the first memory access request.

19. The computer system of claim 17, wherein the memory controller is configured to increase the value stored in the threshold register by a first amount and to decrease the value stored in the threshold register by a second amount.

20. The computer system of claim 17, wherein the threshold register is one of a plurality of threshold registers included in the memory controller.

21. The computer system of claim 17, wherein the memory controller is configured to decrease the value stored in the threshold register by a fixed amount each time a page conflict is detected.

22. The computer system of claim 17, wherein the memory controller further includes a counter, wherein the memory controller is configured to initialize the counter to the value stored in the threshold register in response to generating the signals that cause the memory device to open the first page, wherein the counter is decremented each cycle that the page remains open, and wherein the memory controller is configured to generate the signals to close the first page in response to the counter having a minimum value.

23. The computer system of claim 17, wherein the memory controller further includes a counter, wherein the memory controller is configured to initialize the counter to the value stored in the threshold register in response to a page hit to the first page.

24. The computer system of claim 23, wherein the memory controller includes N sets of page tracking logic, wherein the threshold register is a first threshold register of N threshold registers included in the memory controller, wherein N is an integer greater than or equal to one, and wherein the memory controller is configured to control memory devices including up to M banks, wherein M>N.

25. The computer system of claim 24, wherein in response to an indication that the first threshold register will be used to store a first value indicating how long a page in the first bank should remain open, the control unit is configured to reset the value in the first threshold register to a default value if the first threshold register is currently being used to store a second value indicating how long a page in a second bank included in the memory device should remain open.

26. The computer system of claim 23, wherein the threshold register is one of M threshold registers included in the memory controller, wherein the memory controller is configured to control memory devices including up to M banks, wherein M is an integer greater than one.

27. The computer system of claim 17, wherein each of the M threshold registers is configured to store a threshold value associated with a respective one of the up to M banks.

28. The computer system of claim 27, wherein the memory controller is configured to modify a value stored in a first threshold register of the M threshold registers in response to an access request targeting a second bank of the M banks, wherein the memory controller is configured to inhibit modification of the value stored in the first threshold register in response to access requests targeting banks other than the second bank.

29. The computer system of claim 17, wherein the threshold register is associated with the first bank, and wherein the memory controller is configured to increase the value stored in the threshold register in response to detecting a page miss if a missed page matches a most recently opened page in the first bank.

30. A method comprising:
opening a first page in a memory device in response to a first memory request;
closing the first page if the first page has been open for a length of time indicated by a threshold value;
receiving a second memory request;
increasing the threshold value if a page miss for a most recently open page is detected in response to receiving the second memory access request;
decreasing the threshold value if a page conflict is detected in response to receiving the second memory access request;
inhibiting modification of the threshold value in response to a page hit.

31. The method of claim 30, wherein said increasing increases the threshold value by a first amount and said decreasing decreases the threshold value by a second amount.

32. The method of claim 30, further comprising maintaining a plurality of threshold values, wherein the threshold value is included in the plurality of threshold values.

33. The method of claim 32, wherein each of the plurality of threshold values is associated with a respective one of a plurality of memory banks.

34. The method of claim 33, further comprising inhibiting modification of a first threshold value in response to memory access requests targeting banks other than a first bank with which the first threshold value is associated.

35. The method of claim 30, wherein said modifying comprises decreasing the threshold value by a fixed amount each time a page conflict is detected.

36. A method comprising:
opening a first page in a memory device in response to a first memory request;
closing the first page if the first page has been open for a length of time indicated by a threshold value;
modifying the threshold value in response to a second memory request;
wherein said modifying comprises decreasing the threshold value by a variable amount in response to detecting a page conflict, wherein the variable amount is dependent on how many consecutive page conflicts have been detected.

37. The method of claim 36, further comprising varying the variable amount exponentially in response to successive page conflicts being detected.

38. The method of claim 30, wherein the threshold value is associated with a first bank in the memory device, and wherein said modifying comprises increasing the threshold value in response to detecting a page miss if a missed page matches a most recently opened page within the first bank.

39. A method comprising:
opening a first page in a memory device;
if a page conflict is detected, decreasing a threshold value;
closing the first page if the first page has been open for a length of time indicated by the threshold value;
if a page miss for the first page is detected after said closing and if the first page is a most recently opened page, increasing the threshold value;
inhibiting modification of the threshold value in response to a page hit.

40. A computer system comprising:
means for opening a page in a memory device in response to a first memory access request;
means for closing the page if the page has been open for a length of time indicated by a threshold value;
means for receiving a second memory request;
means for increasing the threshold value if a page miss for a most recently open page is detected in response to receiving the second memory access request;
means for decreasing the threshold value if a page conflict is detected in response to receiving the second memory access request;
means for inhibiting modification of the threshold value in response to a page hit.

* * * * *